United States Patent
Gilb et al.

(10) Patent No.: US 10,612,984 B2
(45) Date of Patent: Apr. 7, 2020

(54) SENSOR ASPIRATION UTILIZING HOOP AIRFLOW INDUCTION

(71) Applicant: Rosemount Aerospace Inc., Burnsville, MN (US)

(72) Inventors: Andrew Gilb, Savage, MN (US); Scott D. Isebrand, Minneapolis, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 275 days.

(21) Appl. No.: 15/718,575

(22) Filed: Sep. 28, 2017

(65) Prior Publication Data
US 2019/0094083 A1    Mar. 28, 2019

(51) Int. Cl.
*G01K 13/02*    (2006.01)

(52) U.S. Cl.
CPC .................. *G01K 13/028* (2013.01)

(58) Field of Classification Search
CPC ..................................... G01K 13/028
See application file for complete search history.

(56) References Cited

U.S. PATENT DOCUMENTS

| | | | |
|---|---|---|---|
| 2,652,216 A | 9/1953 | Hoffman | |
| 3,285,787 A | 11/1966 | Ehrler | |
| 5,653,538 A * | 8/1997 | Phillips | G01K 13/02 374/135 |
| 5,938,527 A * | 8/1999 | Oshima | F24F 1/01 454/344 |
| 7,828,477 B2 | 11/2010 | Benning et al. | |
| 8,104,955 B2 | 1/2012 | Benning et al. | |
| 2005/0193812 A1 | 9/2005 | Ice | |
| 2006/0056489 A1* | 3/2006 | Bernard | G01K 13/02 374/208 |
| 2007/0220984 A1* | 9/2007 | Slagle | G01K 13/02 73/708 |
| 2011/0013664 A1 | 1/2011 | Benning et al. | |
| 2012/0057959 A1* | 3/2012 | Hodgson | F04D 25/08 415/110 |
| 2013/0028763 A1* | 1/2013 | Staniforth | F04D 25/08 417/423.5 |
| 2013/0202413 A1* | 8/2013 | Nock | F04D 29/703 415/121.2 |

FOREIGN PATENT DOCUMENTS

CN    202182069 U    4/2012

OTHER PUBLICATIONS

Extended European Search Report for European Patent Application No. 18196242.4, dated Feb. 22, 2019, 7 pages.

* cited by examiner

*Primary Examiner* — Lisa M Caputo
*Assistant Examiner* — Philip L Cotey
(74) *Attorney, Agent, or Firm* — Kinney & Lange, P.A.

(57) ABSTRACT

A probe includes a housing defining a flow passage for a first fluid and having an entrance port and an exit port, a sensor configured to sense a parameter of the first fluid and positioned within the flow passage, and a hoop ejector connected externally to the housing such that a channel of the hoop ejector surrounds the exit port. The hoop ejector has a plurality of holes configured to port a second fluid from the channel such that the first fluid is aspirated from the flow passage and out through the exit port.

18 Claims, 7 Drawing Sheets

SENSOR ASPIRATION UTILIZING HOOP AIRFLOW INDUCTION

BACKGROUND

The present disclosure relates to sensors, and in particular, to total air temperature (TAT) probes.

TAT probes are mounted on aircraft to measure the total air temperature on the skin of the aircraft. When an aircraft is stationary and exposed to direct sunlight, the TAT probe is susceptible to radiation error. More specifically, the temperature of the TAT probe and the temperature of air inside the TAT probe increases, causing the TAT probe to indicate inaccurate temperature readings.

SUMMARY

A probe includes a housing defining a flow passage for a first fluid and having an entrance port and an exit port, a sensor configured to sense a parameter of the first fluid and positioned within the flow passage, and a hoop ejector connected externally to the housing such that a channel of the hoop ejector surrounds the exit port. The hoop ejector has a plurality of holes configured to port a second fluid from the channel such that the first fluid is aspirated from the flow passage and out through the exit port.

A hoop ejector includes a hoop body, the hoop body including a first end and a second end, a hoop positioned between the first end and the second end and having an outer wall and an inner wall, a channel located between the outer wall and the inner wall of the hoop, holes positioned in the inner wall of the hoop and extending at an angle toward a downstream end of the hoop body from an outer diameter of the inner wall of the hoop to an inner diameter of the inner wall of the hoop, an opening interior to the hoop, the opening being formed by an inner diameter of the inner wall, and a hoop inlet located at a second end of the hoop body.

DETAILED DESCRIPTION

In general, the present disclosure describes a hoop ejector for a TAT probe of an aircraft that utilizes a hoop body with angled holes to pull air from inside the TAT probe in order to induce airflow through the TAT probe, reducing the solar radiation effect. As a result, the TAT probe is capable of producing more accurate readings when the aircraft is grounded and exposed to direct sunlight.

Figure 1A:
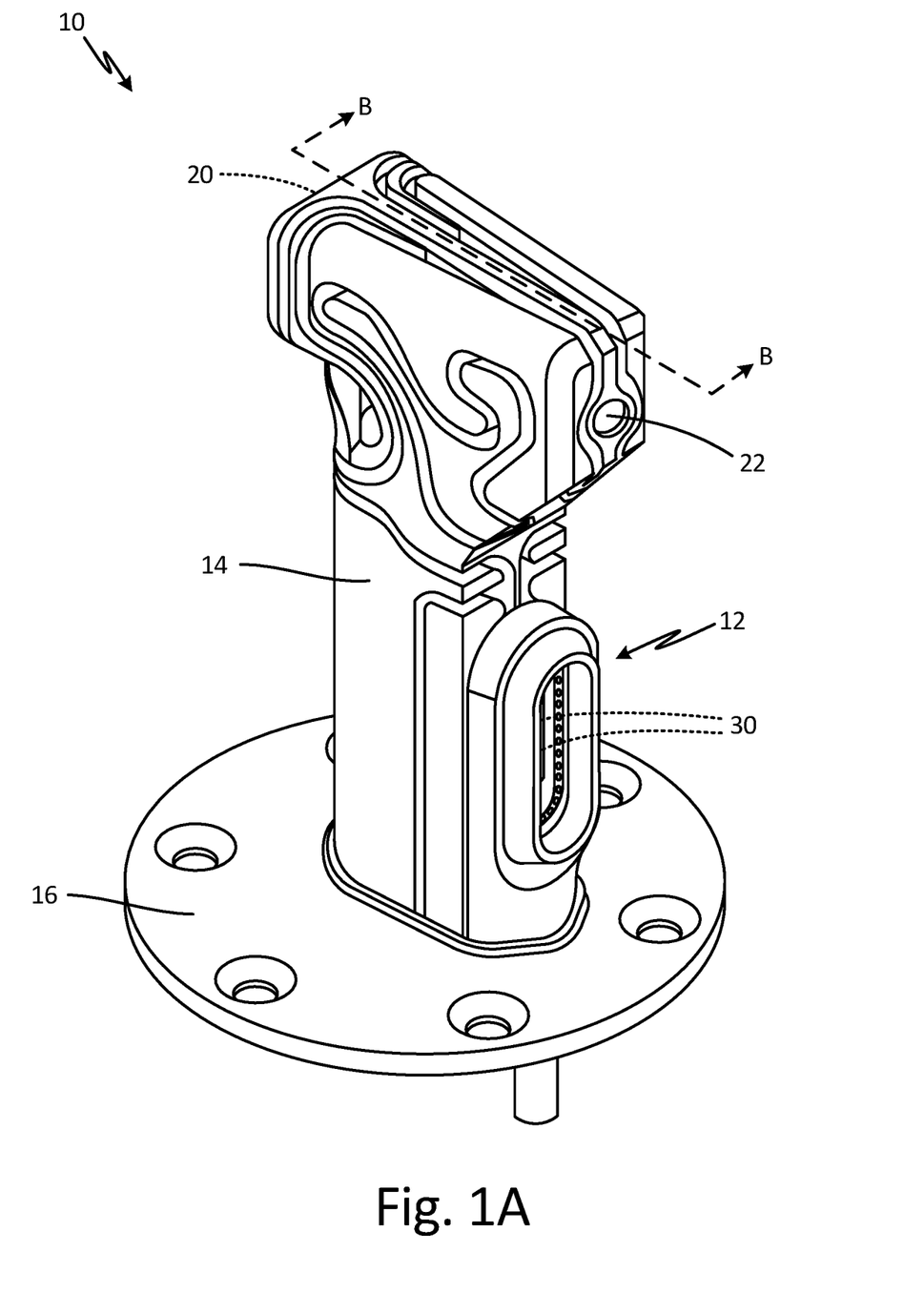
FIG. 1A is a rear isometric view of a total air temperature (TAT) probe with a hoop ejector.
Figure 1B:
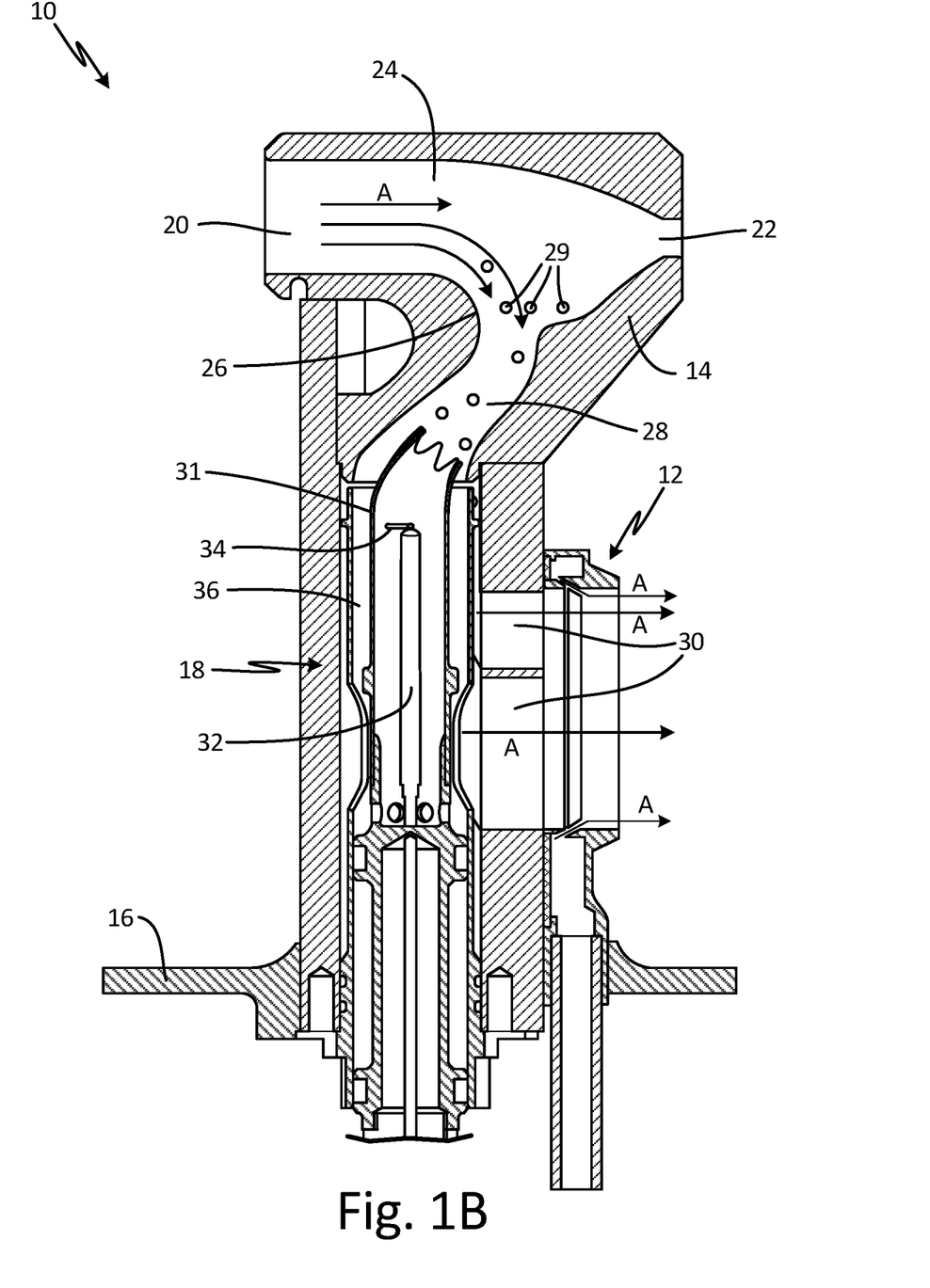
FIG. 1B is a cross-sectional view of the TAT probe with the hoop ejector taken along line B-B of FIG. 1A.

FIG. 1A is a rear isometric view of TAT probe 10 with hoop ejector 12. FIG. 1B is a cross-sectional view of TAT probe 10 with hoop ejector 12 taken along line B-B of FIG. 1A. FIGS. 1A and 1B will be discussed together. TAT probe 10 includes hoop ejector 12, housing 14, mounting flange 16, and sensor assembly 18 (shown in FIG. 1B). Housing 14 includes inlet scoop 20, outlet 22, main airflow passage 24 (shown in FIG. 1B), flow separation bend 26 (shown in FIG. 1B), TAT sensor flow passage 28 (shown in FIG. 1B), bleed holes 29 (shown in FIG. 1B), and exit ports 30. Sensor assembly 18 includes element flow tube 31, sensing elements 32, tip support 34, and flow liner 36. Also shown in FIG. 1B is airflow A.

TAT probe 10 is a temperature probe for sensing temperature of a first fluid (in this embodiment, airflow A). TAT probe 10 has hoop ejector 12 connected externally to TAT probe 10 at a back or downstream end of housing 14. Hoop ejector 12 is mounted to an exterior surface of housing 14. Housing 14 is attached to mounting flange 16. Housing 14 is heated and provides structure for TAT probe 10. Mounting flange 16 mounts TAT probe 10 to an aircraft. Sensor assembly 18 is positioned within housing 14.

Inlet scoop 20 is located near an outer end of housing 14 at a front or upstream end of housing 14. Inlet scoop 20 is an entrance port of housing 14. Outlet 22 is located near an outer end of housing 14 at a back or downstream end of housing 14. Main airflow passage 24 is a passageway within housing 14 that extends from inlet scoop 20 to outlet 22. Main airflow passage 24 makes up a first portion of the flow passage within TAT probe 10. Flow separation bend 26 is a curve in housing 14 between inlet scoop 20 and outlet 22 and adjacent main airflow passage 24 and TAT sensor flow passage 28. Flow separation bend 26 provides a curve of about 120 degrees between main airflow passage 24 and a first end of TAT sensor flow passage 28. In alternate embodiments, TAT probe 10 does not include flow separation bend 26. In such embodiments, a curve between main airflow passage 24 and the first end of TAT sensor flow passage 28 may be about 90 degrees. TAT sensor flow passage 28 is a passageway within housing 14 that has a first end positioned between inlet scoop 20 and outlet 22 and adjacent main airflow passage 24. The first end of TAT sensor flow passage 28 is curved along flow separation bend 26. In alternate embodiments, the first end of TAT sensor flow passage 28 may be straight. Further, in alternate embodiments, the first end of TAT sensor flow passage 28 may be perpendicular to main airflow passage 24. The second end of TAT sensor flow passage 28 extends into housing 14 toward mounting flange 16. TAT sensor flow passage 28 is in fluid communication with main airflow passage 24. TAT sensor flow passage 28 makes up a second portion of the flow passage within TAT probe 10. Bleed holes 29 are passageways in housing 14 that extend from main airflow passage 24 or TAT sensor flow passage 28 through housing 14 to an exterior of housing 14. Exit ports 30 are passageways in housing 14 that extend from a second end of TAT sensor flow passage 28 through housing 14 to the exterior of housing 14. The passageways of exit ports 30 reach the exterior of housing 14 at the downstream end or back of housing 14. Hoop ejector 12 is connected to the downstream end or back of housing 14 adjacent exit ports 30. Hoop ejector 12 is shaped such that it surrounds exit ports 30.

Element flow tube 31 of sensor assembly 18 is annular and positioned within TAT sensor flow passage 28 around sensing elements 32. Element flow tube 12 has a body portion in the second end of TAT sensor flow passage 28 and an entrance that extends upstream from the body portion into the first end of TAT sensor flow passage 28. The entrance of element flow tube 12 has protrusions that form peaks and valleys around the entrance. Sensing elements 32 are rod-like sensors configured to sense temperature and located within element flow tube 31. Sensing elements 32 may be wire wound platinum resistance devices. Sensor assembly 18 has two sensing elements 32. In alternate embodiments, sensor assembly 18 has any number of sensing elements 32. Tip support 34 is connected to an inner surface of element flow tube 31 and extends toward and contacts upper ends of sensing elements 32. Flow liner 36 is annular and positioned around element flow tube 31. As such, sensing elements 32, element flow tube 31, and flow liner 36 make up a concentric tubular assembly in TAT sensor flow passage 28.

TAT probe 10 is installed on an aircraft. A first fluid, such as airflow A, enters housing 14 of TAT probe 10 through inlet scoop 20. A portion of airflow A flows through main airflow passage 24 and out of housing 14 through outlet 22. Some airflow A may also enter housing 14 through outlet 22. Another portion of airflow A flows partially through main airflow passage 24 and turns into TAT sensor flow passage 28 along flow separation bend 26. Airflow A curves along flow separation bend 26 as airflow A flows into and through the first end of TAT sensor flow passage 28. Some of airflow A in main airflow passage 24 and some of airflow A in TAT sensor flow passage 28 flows out of housing 14 through bleed holes 29. Some airflow A may also enter main airflow passage 24 and TAT sensor flow passage 28 through bleed holes 29. Airflow A remaining in TAT sensor flow passage 28 flows around and into sensor assembly 18. Airflow A flows through element flow tube 31 to reach sensing elements 32. Airflow A exits the second end of TAT sensor flow passage 28 and housing 14 through exit ports 30. Airflow A flows through hoop ejector 12 after exiting exit ports 30. Sensing elements 32 measure the total air temperature of airflow A that enters element flow tube 31.

Hoop ejector 12 induces airflow A out of TAT sensor flow passage 38 and exit ports 30 and through hoop ejector 12. A second fluid, such as compressed air, is supplied to hoop ejector 12. As the compressed air moves through hoop ejector 12, the compressed air is forced through smaller areas, or holes (as further described below), in hoop ejector 12. Movement through the smaller areas or holes accelerates the airflow, causing a reduction in the pressure of the air at the hole, eliciting a Venturi effect. A pressure differential is created between air in TAT probe 10 and air in hoop ejector 12. Consequently, airflow A in TAT probe 10 moves from the area of higher pressure toward the area of lower pressure at hoop ejector 12. A portion of airflow A moving out of TAT probe 10 subsequently causes a portion of airflow A to enter TAT probe 10 through inlet scoop 20, outlet 22, and bleed holes 29. As a result, hoop ejector 12 is capable of inducing airflow A into and through TAT probe 10. As such, hoop ejector 12 can move airflow A through TAT probe 10 when an aircraft is stationary.

Generally, airflow A enters TAT probe 10 when an aircraft is in motion. When an aircraft is grounded and stationary, air may be stagnant. Further, the aircraft may be exposed to direct sunlight. Consequently, TAT probe 10, and the air inside TAT probe 10, can experience a temperature increase, which can cause TAT probe 10 to produce inaccurate temperature readings. This solar radiation error can be reduced by moving airflow A through TAT probe 10 via hoop ejector 12. Moreover, past flow assistance devices for TAT probes have been built into the TAT probe, such as in the TAT sensor flow passage or the housing, to push airflow A outward from inside TAT probe 10. A built-in flow assistance device can be problematic for smaller TAT probes that do not have space available for the device. Further, adding a flow assistance device inside the TAT probe can change the internal geometry of the sensor and affect the performance of the TAT probe. Hoop ejector 12 can be connected externally to TAT probe 10 on an exterior of housing 14 near exit ports 30 to pull airflow A through TAT probe 10 and out exit ports 30. Hoop ejector 12 does not require space within TAT probe 10. As a result, TAT probe 10 can be smaller, lighter, and built for improved airflow dynamics. Moreover, hoop ejector 12 does not change the internal geometry of TAT probe 10 and thus does not inhibit performance of TAT probe 10.

Figure 2A:
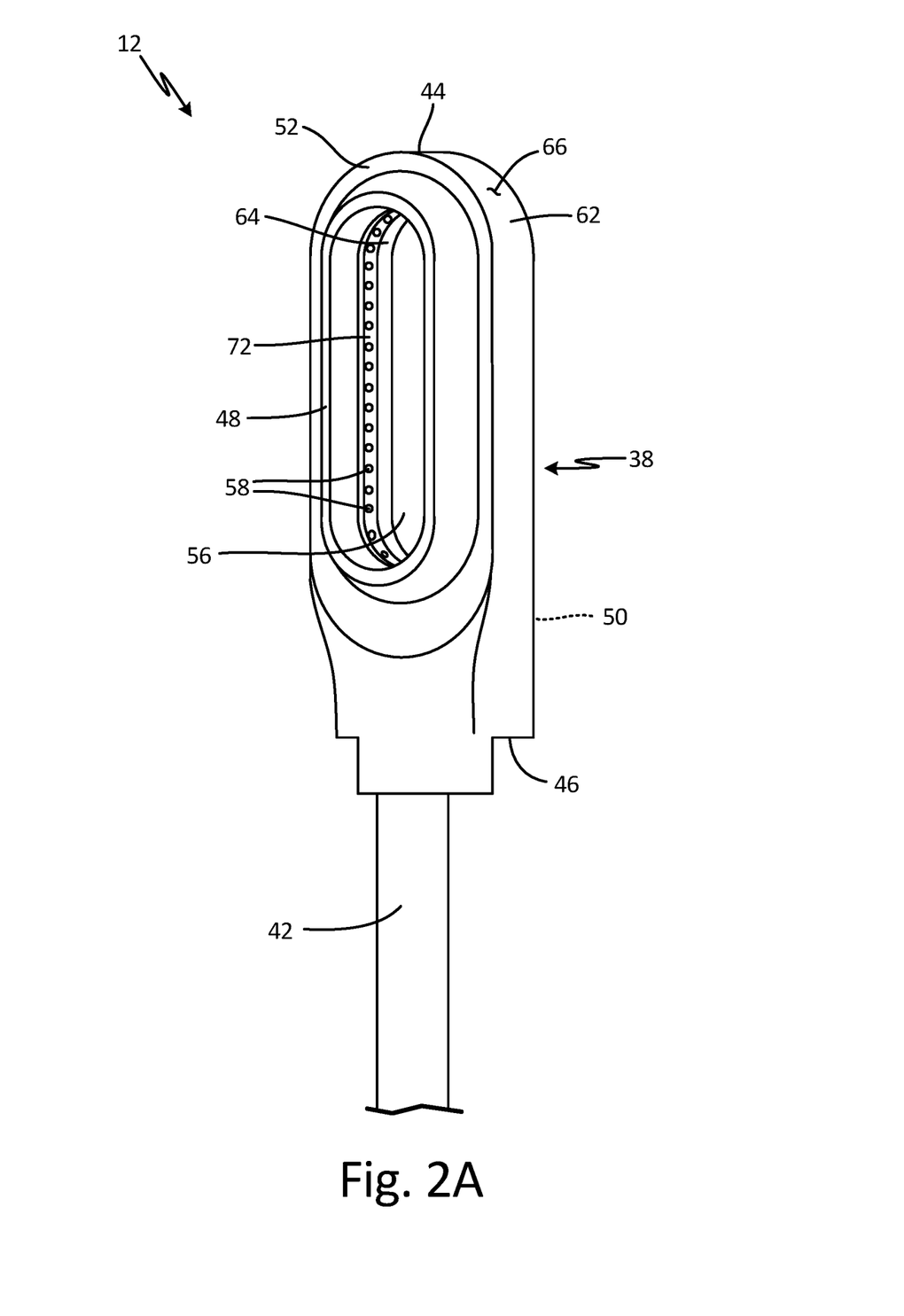
FIG. 2A is an isometric view of a downstream end of the hoop ejector.
Figure 2B:
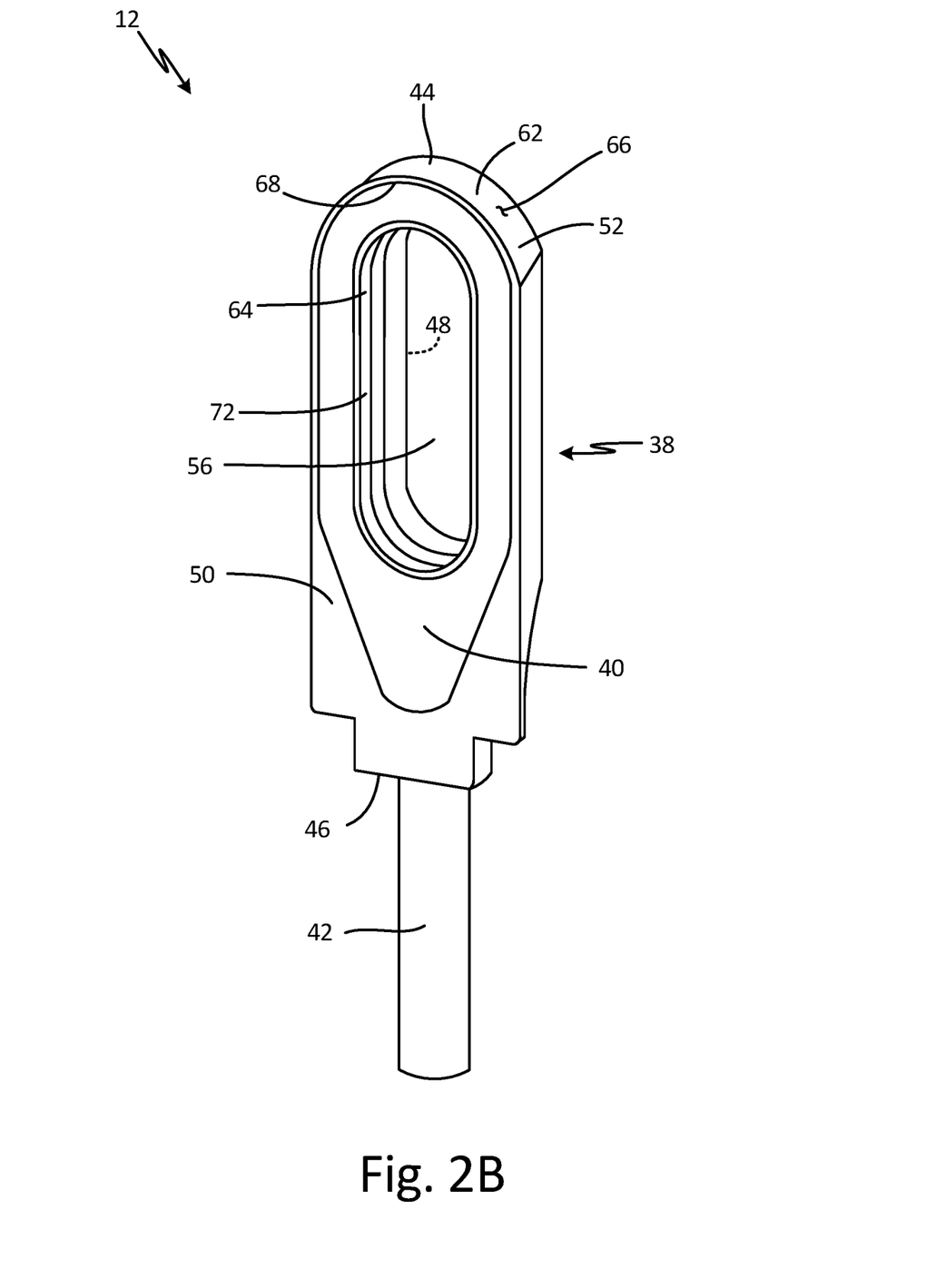
FIG. 2B is an isometric view of an upstream end of the hoop ejector.
Figure 2C:
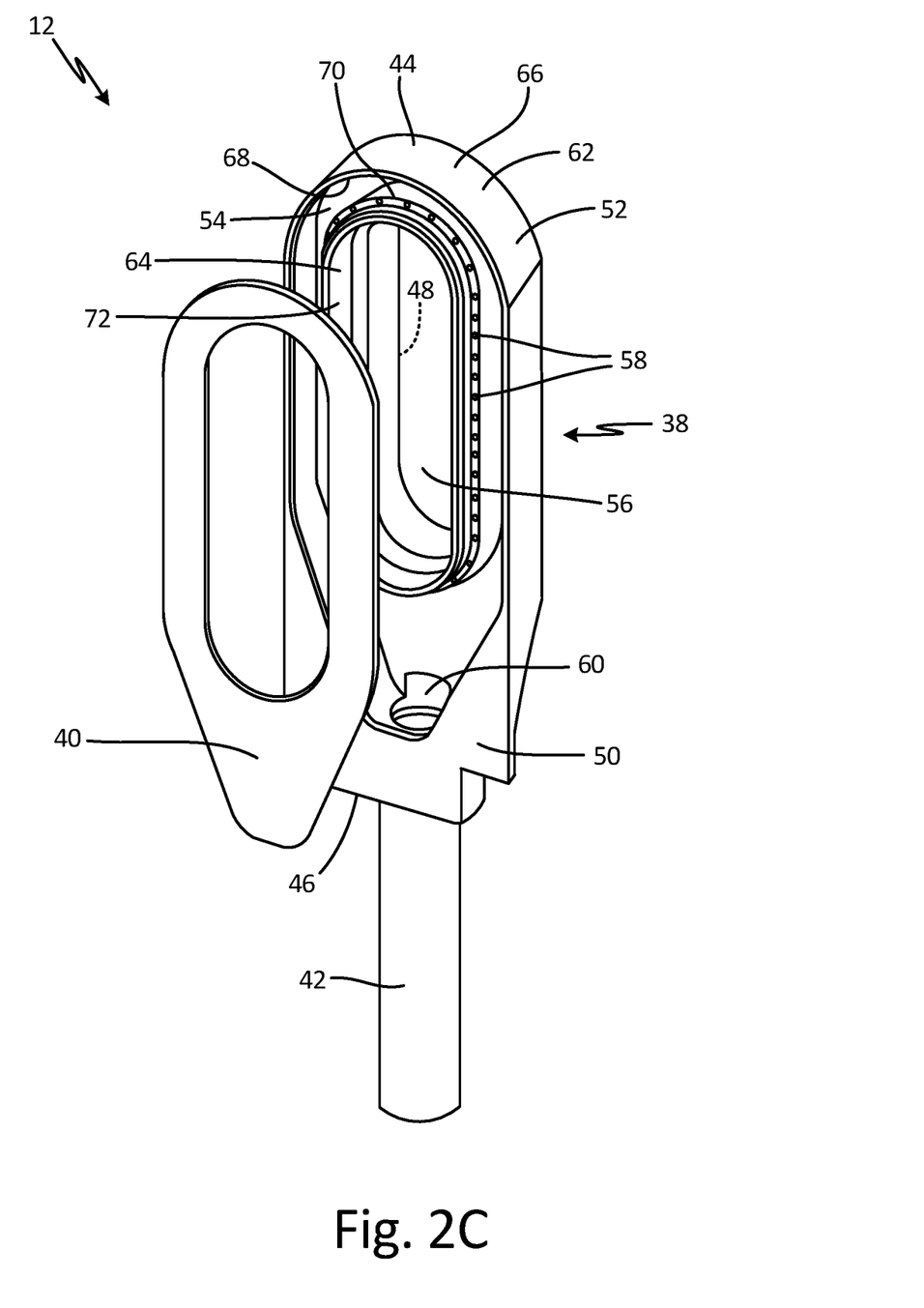
FIG. 2C is an isometric view of the upstream end of the hoop ejector with a cover removed.
Figure 2D:
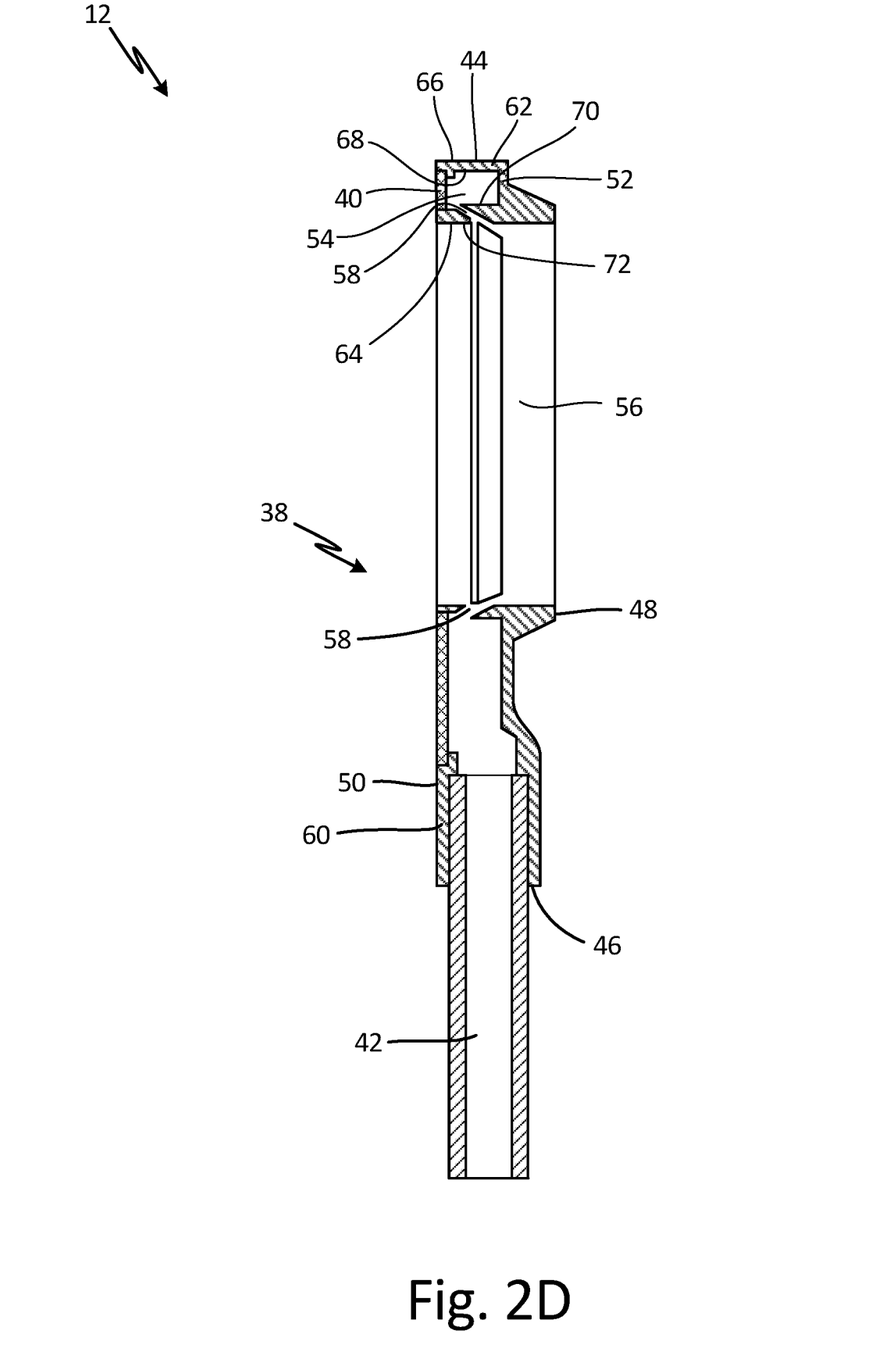
FIG. 2D is a cross-sectional view of the hoop ejector.
Figure 2E:
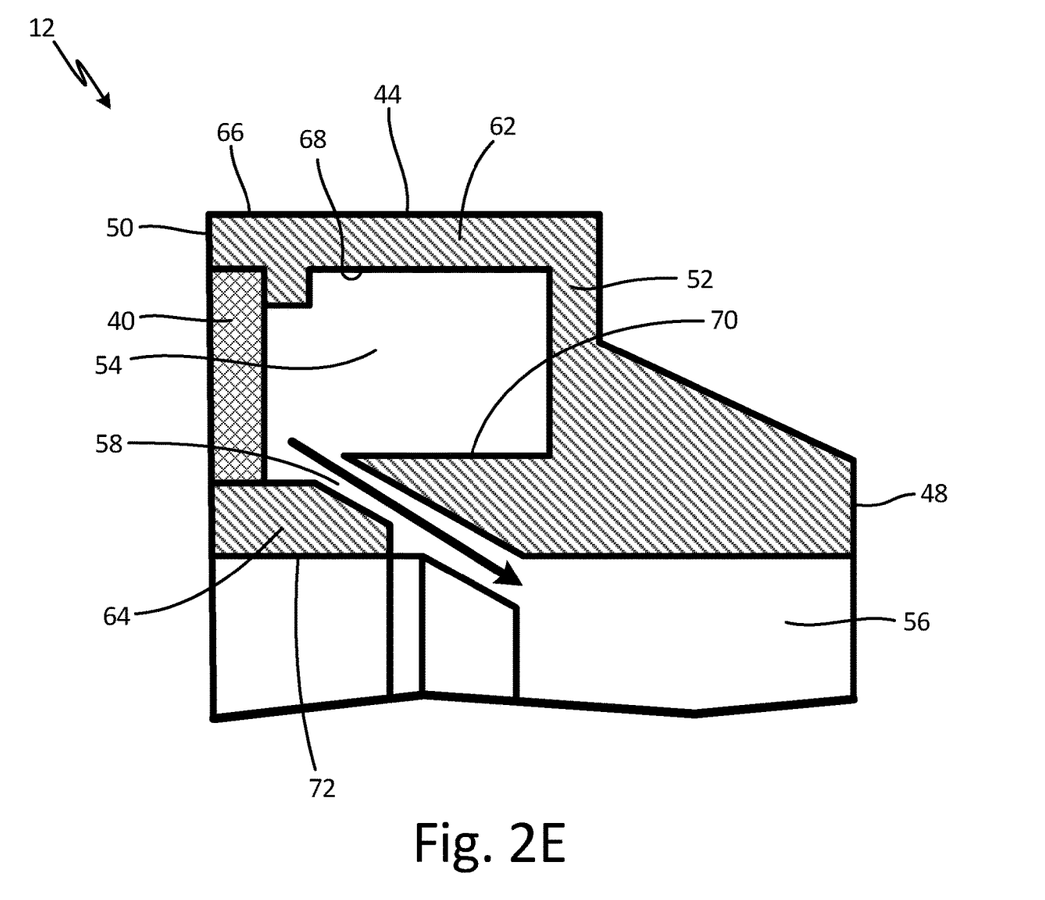
FIG. 2E is an enlarged partial cross-sectional view of the hoop ejector showing a hole.

FIG. 2A is an isometric view of a downstream end or back 48 of hoop ejector 12. FIG. 2B is an isometric view of an upstream end or front 50 of hoop ejector 12. FIG. 2C is an isometric view of the upstream end or front 50 of hoop ejector 12 with cover 40 removed. FIG. 2D is a cross-sectional view of hoop ejector 12. FIG. 2E is an enlarged partial cross-sectional view of hoop ejector 12 showing holes 58. FIGS. 2A, 2B, 2C, 2D, and 2E will be discussed together. Hoop ejector 12 includes hoop body 38, cover 40 (shown in FIGS. 2B, 2C, 2D, and 2E), and tube 42 (shown in FIGS. 2A-2D). Hoop body 38 includes first end 44, second end 46 (shown in FIGS. 2A-2D), back 48, front 50, hoop 52, channel 54 (shown in FIGS. 2C-2E), opening 56, holes 58 (shown in FIGS. 2A, 2C, 2D, 2E), and hoop inlet 60 (shown in FIGS. 2C and 2D). Hoop 52 includes outer wall 62 and inner wall 64. Outer wall 62 has outer diameter 66 and inner diameter 68 (shown in FIGS. 2B-2E). Inner wall 64 has outer diameter 70 (shown in FIGS. 2C-2E) and inner diameter 72.

Hoop ejector 12 has hoop body 38 with an opening for cover 40. Cover 40 is attached to hoop body 38 at the opening such that cover 40 is flush with hoop body 30. Cover 40 has an opening at a center of cover 40. Tube 42 is connected at an end of hoop body 38.

Hoop body 38 has first end 44 at a first end of hoop body 38 and second end 46 at a second end of hoop body 38. Tube 42 is connected at second end 46 of hoop body 38. Back 48 is at a downstream end of hoop body 38 and extends from first end 44 to second end 46. Front 50 is at an upstream end of hoop body 38 and extends from first end 44 to second end 46. Front 50 connects to housing 14 (shown in FIGS. 1A and 1B) at a back or downstream end of TAT probe 10. The opening to which cover 40 attaches is at front 50 of hoop body 38. Hoop 52 is positioned between first end 44 and second end 46 of hoop body 38. A portion of hoop 52 near first end 44 is oval or racetrack shaped. Channel 54 is located in hoop 52. A portion of channel 54 near first end 44 is oval or racetrack shaped. Channel 54 surrounds all exit ports 30. Opening 56 is interior to hoop 52, and extends from front 50 of hoop body 38 to back 48 of hoop body 38. Opening 56 is oval or racetrack shaped. Opening 56 is in alignment with the opening in cover 40. Additionally, hoop ejector 12 is positioned on a back of housing 14 adjacent exit ports 30 such that opening 56 is positioned to surround all exit ports 30. Holes 58 are positioned in hoop 52 and extend through hoop 52 from channel 54 to opening 56. As such, holes 58 are in fluid communication with channel 54 and opening 56. Holes 58 are located around hoop 52 such that holes 58 are positioned around an entire perimeter of opening 56. Holes 58 are small. A cross-sectional area of each hole 58 is constant. Hoop inlet 60 is located at second end 46 of hoop body 38. Tube 42 is positioned in hoop inlet 60. Hoop ejector 12 can be a single unitary part made using additive manufacturing.

Hoop 52 has outer wall 62 and inner wall 64 interior to outer wall 62. Outer wall 62 and inner wall 64 define channel 54. As such, channel 54 is located between outer wall 62 and inner wall 62. Outer wall 62 makes up radially outer wall of hoop body 38. Inner wall 64 makes up a perimeter of opening 56. Holes 58 are positioned in inner wall 64.

Outer wall 62 has outer diameter 66 and inner diameter 68. Cover 40 attaches to hoop body 38 at inner diameter 68 of outer wall 62. The shape formed by inner diameter 68 of outer wall 62 matches the shape of cover 40. Inner wall 64 has outer diameter 70 and inner diameter 72. Inner diameter 68 of outer wall 62 and outer diameter 70 of inner wall 64 define channel 56. Holes 58 extend from outer diameter 70 of inner wall 64 to inner diameter 72 of inner wall 64 at an angle toward back 48 of hoop body 38. A cross-sectional area of each hole 58 is constant as hole 58 extends from inner diameter 72 of inner wall 64 to outer diameter 70 of inner wall 64. Inner diameter 72 of inner wall 64 forms opening 56.

Fluid, such as compressed air, moves through tube 42 and is suppled to channel 54 through hoop inlet 60. Compressed air is then forced around channel 54 and fills channel 54. The compressed air is subsequently forced through holes 58 and into opening 56. As such, holes 58 are configured to port compressed air from channel 54 to opening 56. The small space created by holes 58 speeds up the velocity of the airflow moving through holes 58, decreasing the pressure, which is known as the Venturi effect. As a result, the air pressure within opening 56 is decreased. A pressure differential is created between fluid, such as air, in TAT probe 10 and air in opening 56 of hoop ejector 12. Air in the higher pressure environment of TAT probe 10 moves out of TAT probe 10 to the area of lower pressure in opening 56. As such, air is aspirated from main airflow passage 24 and TAT sensor flow passage 28 within housing 14 of TAT probe 10 and out of TAT probe 10 through exit ports 30. Because holes 58 extend from outer diameter 70 to inner diameter 72 of inner wall 64 at an angle facing away from housing 14 of TAT probe 10, that airflow exiting holes 58 at opening 56 moves away from TAT probe 10. More specifically, the airflow exiting holes 58 attaches to inner diameter 72 of inner wall 64 of hoop 52, or a perimeter of opening 56, and moves along inner wall 64 toward back 48 of hoop body 38 and out of opening 56, in accordance with the Coanda effect. As a result, airflow in TAT sensor flow passage 28 that is pulled through exit ports 30 joins the airflow at opening 56 and moves in the same direction out of hoop ejector 12. Pulling airflow out of TAT probe 10 induces fresh airflow into inlet scoop 20, outlet 22, and bleed holes 29 of TAT probe 10.

Because hoop ejector 12 is attached to a back or downstream end of housing 14, less available space inside TAT sensor flow passage 28 and housing 14 is required. As such, TAT probe 10 can be smaller and lighter, and hoop ejector 12 does not disrupt the internal geometry of TAT probe 10. Further, hoop ejector 12 is shaped such that hoop ejector 12 does not block airflow, which may contain ice particles or fluid, as airflow exits through exit ports 30. As a result, the possibility of ice accretion on hoop ejector 12 is reduced. Opening 56 is positioned around all of exit ports 30 to maximize the amount of airflow that can be pulled from TAT sensor flow passage 28. Hoop ejector 12 pulling air from TAT probe 10 induces movement of airflow through TAT probe 10. When an aircraft is grounded and in direct sunlight, drawing air from TAT probe 10 using hoop ejector 12 pulls fresh air into TAT probe 10. Consequently, solar radiation error is reduced up to 95 percent, resulting in more accurate temperature readings.

While hoop ejector 12 has been described in reference to TAT probe 10, hoop ejector 12 can be used on any suitable sensor to pull air through the sensor. For example, hoop ejector 12 can be used in conjunction with a probe that senses a parameter other than temperature and can operate with fluids other than air.

Discussion of Possible Embodiments

The following are non-exclusive descriptions of possible embodiments of the present invention.

A probe includes a housing defining a flow passage for a first fluid and having an entrance port and an exit port; a sensor configured to sense a parameter of the first fluid and positioned within the flow passage; and a hoop ejector connected externally to the housing such that a channel of the hoop ejector surrounds the exit port, the hoop ejector having a plurality of holes configured to port a second fluid from the channel such that the first fluid is aspirated from the flow passage and out through the exit port.

The probe of the preceding paragraph can optionally include, additionally and/or alternatively, any one or more of the following features, configurations and/or additional components:

The hoop ejector further includes: a hoop body, the hoop body including: a hoop having an outer wall and an inner wall, the channel being located between the outer wall and the inner wall of the hoop, and the plurality of holes being positioned in the inner wall of the hoop and extending from an outer diameter of the inner wall of the hoop to an inner diameter of the inner wall of the hoop; an opening interior to the hoop, wherein the opening is formed by an inner diameter of the inner wall; and a hoop inlet located at a second end of the hoop body.

The opening of the hoop body is positioned around the exit port.

The plurality of holes extend from an outer diameter of the inner wall of the hoop to an inner diameter of the inner wall of the hoop at an angle, the angle of the holes being away from the housing.

The plurality of holes extend around an entire perimeter of the opening.

The hoop ejector further includes a cover with an opening in alignment with the opening of the hoop body, the cover being configured to attach to an opening at an upstream end of the hoop body.

The hoop ejector further includes a tube positioned in the hoop inlet of the hoop body.

A cross-sectional area of the plurality of holes is the same at the inner diameter of the inner wall as at the outer diameter of the inner wall.

The probe is an air temperature probe.

A hoop ejector includes a hoop body, the hoop body including: a first end and a second end; a hoop positioned between the first end and the second end and having an outer wall and an inner wall; a channel located between the outer wall and the inner wall of the hoop; holes positioned in the inner wall of the hoop and extending at an angle toward a downstream end of the hoop body from an outer diameter of the inner wall of the hoop to an inner diameter of the inner wall of the hoop; an opening interior to the hoop, wherein the opening is formed by an inner diameter of the inner wall; and a hoop inlet located at a second end of the hoop body.

The hoop ejector of the preceding paragraph can optionally include, additionally and/or alternatively, any one or more of the following features, configurations and/or additional components:

The hoop inlet is configured to supply compressed air to the channel.

An upstream end of the hoop body is configured to connect to a downstream end of a total air temperature probe.

A tube positioned in the hoop inlet of the hoop body.

A cover configured to attach to the opening of the hoop body at an upstream end of the hoop body, wherein the cover has an opening in alignment with the opening of the hoop body.

A portion of the hoop has an oval or racetrack shape.

The cross-sectional area of the holes is constant.

The holes are configured to speed up the velocity of air as air passes through the holes and lower the pressure of air as air passes through the holes.

The holes are configured to aspirate air out of a TAT probe.

The holes are positioned in the inner wall of the hoop, and the holes extend around an entire perimeter of the opening.

The hoop ejector is made using additive manufacturing.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A probe comprising:
   a housing defining a flow passage for a first fluid and having an entrance port and an exit port;
   a sensor configured to sense a parameter of the first fluid and positioned within the flow passage; and
   a hoop ejector connected to an exterior surface of the housing such that a channel of the hoop ejector surrounds the exit port, the hoop ejector having a plurality of holes configured to port a second fluid from the channel such that the first fluid is aspirated from the flow passage and out through the exit port.

2. The probe of claim 1, wherein the hoop ejector further includes:
   a hoop body, the hoop body including:
      a hoop having an outer wall and an inner wall,
      the channel being located between the outer wall and the inner wall of the hoop, and the plurality of holes being positioned in the inner wall of the hoop and extending from an outer diameter of the inner wall of the hoop to an inner diameter of the inner wall of the hoop;
      an opening interior to the hoop, wherein the opening is formed by an inner diameter of the inner wall; and
      a hoop inlet located at a second end of the hoop body.

3. The probe of claim 2, wherein the opening of the hoop body is positioned around the exit port.

4. The probe of claim 2, wherein the plurality of holes extend from an outer diameter of the inner wall of the hoop to an inner diameter of the inner wall of the hoop at an angle, the angle of the holes being away from the housing.

5. The probe of claim 2, wherein the plurality of holes extend around an entire perimeter of the opening.

6. The probe of claim 2, wherein the hoop ejector further includes a cover with an opening in alignment with the opening of the hoop body, the cover being configured to attach to an opening at an upstream end of the hoop body.

7. The probe of claim 2, wherein the hoop ejector further includes a tube positioned in the hoop inlet of the hoop body.

8. The probe of claim 2, wherein a cross-sectional area of the plurality of holes is the same at the inner diameter of the inner wall as at the outer diameter of the inner wall.

9. The probe of claim 1, wherein the probe is an air temperature probe.

10. A hoop ejector comprising:
    a hoop body, the hoop body including:
       a first end and a second end;
       a hoop positioned between the first end and the second end and having an outer wall and an inner wall;
       a channel located between the outer wall and the inner wall of the hoop;
       holes positioned in the inner wall of the hoop and extending at an angle toward a downstream end of the hoop body from an outer diameter of the inner wall of the hoop to an inner diameter of the inner wall of the hoop;
       an opening interior to the hoop, wherein the opening is formed by an inner diameter of the inner wall;
       a cover configured to attach to the opening of the hoop body at an upstream end of the hoop body, wherein the cover has an opening in alignment with the opening of the hoop body; and
       a hoop inlet located at a second end of the hoop body, wherein an upstream end of the hoop body is configured to connect to a downstream end of a total air temperature probe.

11. The hoop ejector of claim 10, wherein the hoop inlet is configured to supply compressed air to the channel.

12. The hoop ejector of claim 10 and further including a tube positioned in the hoop inlet of the hoop body.

13. The hoop ejector of claim 10, wherein a portion of the hoop has an oval or racetrack shape.

14. The hoop ejector of claim 10, wherein the cross-sectional area of the holes is constant.

15. The hoop ejector of claim 10, wherein the holes are configured to speed up the velocity of air as air passes through the holes and lower the pressure of air as air passes through the holes.

16. The hoop ejector of claim 10, wherein the holes are configured to aspirate air out of a TAT probe.

17. The hoop ejector of claim 10, wherein the holes are positioned in the inner wall of the hoop, and the holes extend around an entire perimeter of the opening.

18. The hoop ejector of claim 10, wherein the hoop ejector is made using additive manufacturing.

* * * * *